United States Patent Office 2,865,782
Patented Dec. 23, 1958.

2,865,782

METHOD FOR PREPARING COMPOUNDS COMPRISING SILICON AND OXYGEN

Roger W. Strassburg, Cleveland, Ohio, assignor to The B. F. Goodrich Company, New York, N. Y., a corporation of New York No Drawing. Application December 22, 1955
Serial No. 554,640

10 Claims. (Cl. 106—308)

This invention relates to novel compounds comprising silicon and oxygen. In particular, the present invention pertains to fibrous compositions containing silicon and oxygen which are very useful as reinforcing pigments for organic polymeric compositions such as elastomers, to elastomeric and organic polymeric compositions containing such fibrous compositions and to methods for making the same.

"Monox" or solid, particulate, disproportionated silicon monoxide $(SiO_2)_x \cdot (Si)_y$ where $x$ and $y$ are integers, is produced by the reaction of carbon and silica at high temperatures under reducing conditions, such as in an arc furnace, and allowing the gaseous reaction products containing SiO to condense in a partial or in an essentially complete vacuum or vacuum chamber or in an inert atmosphere or gas of nitrogen, argon, helium, CO, etc. In place of carbon, silicon or silicon carbide can be used to produce SiO gas. Alternatively, silicon metal can carefully be oxidized to SiO gas which then can be condensed. Still other methods for making Monox can be used.

Monox is characterized as being solid, finely-divided or particulate and exhibiting under the electron microscope a mixture of fibrous particles and non fibrous and/or spherical particles. If the process is conducted in a manner that the inert condensing gas and the silicon monoxide gas stream mix together with little or no turbulence, especially long and tendrilous fibers are obtained and the amount of the non fibrous particles is materially reduced so that they are present generally in a minor amount. In such process the inert condensing gas also should be essentially pure, that is, it should contain only a few parts of an oxidizing gas per million parts of condensing gas, or if it is of a commercial variety containing a minor amount of oxygen or oxidizing gases, it should also contain a minor amount of an amine such as ammonia, ethyl amine and the like or a hydrogen-furnishing gas such as hydrogen itself, methane, ethane, etc. to remove any traces of oxidizing gas in the inert condensing gas as well as in the furnace gases. If desired, generally non fibrous Monox can be obtained by merely blowing the silicon monoxide gas stream from the furnace with any of the above inert condensing gases, or gas mixtures, to cause turbulence in the mixing gas streams. The Monox may contain minor amounts of nitrogen, usually about 1–8% by weight of bound nitrogen, attached to two silicon atoms, probably as $(SiONH)_x$, $x$ being an integer,

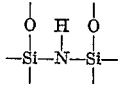

so that part of the Si is tied up, if the inert condensing gas was nitrogen and if it also contained from about 0.5 to 9% by volume of a gaseous amine. However, very little (less than 1% by weight) or no nitrogen is present in the Monox if a pure inert condensing gas is used or a commercial variety of inert gas containing a hydrogen furnishing gas is used and the silica and carbon employed are very pure. The latter described Monox effects a less rapid cure in rubber containing compositions due to its greater acidity.

In general, the fibers of the fibrous type of Monox have a ratio of length to width of from about 10:1 to 50:1 or greater and exhibit a surface area of from about 60 to 200 square meters per gram although the surface area may be smaller or larger. Their average length will vary from about 50 to 600 millimicrons or higher. The non fibrous particles, if any, in the mixture may have an average particle size of from about 5 to 200 m$\mu$ and a surface area of from about 200 to 300 m.$^2$/g. When the SiO gas is blown with an inert gas, the generally non fibrous particles obtained have a surface area of from about 200 to 300 m.$^2$/g. and a random range of particle sizes of from about 5 to 200 m$\mu$.

Although the non fibrous forms of Monox reinforce elastomers to some extent, fibrous or substantially fibrous Monox, particularly where the fibers are very long and the ratio of the length to the width of the fibers is high, is very useful as a reinforcing pigment for various elastomeric products such as rubber, vinyl, polyesterurethanes and the like. However, Monox is brown, and, accordingly, the color of the products produced with it are brown. This color can not be masked by the use of color pigments without using a large amount which materially destroys the reinforcing properties imparted by the Monox.

It has been found that Monox can be treated with a halogen gas or with a mixture of a halogen gas and an oxidizing gas, for example, chlorine gas or chlorine and oxygen gases, to obtain a light colored to white, amorphous silica product having bound nitrogen as $(SiONH)_x$

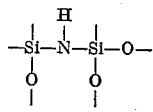

$x$ being an integer, if such bound nitrogen was originally present in the Monox, and having essentially the same physical form and particle size as exhibited by the original brown Monox but containing up to about 3% by weight of halogenated Monox or halogen containing silica can be represented by the following schematic formula:

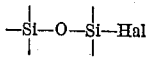

The halogenated product may have a larger surface area than the original Monox. It will also contain more silicon dioxide than the original Monox depending on the amount of oxidizing gas used with the halogen gas and the extent of the treatment. Methods for obtaining such product by halogenating or halogenating and oxidizing Monox are disclosed in copending patent application of Roger W. Strassburg, entitled "Compositions and Methods for Making the Same," Serial No. 554,614, and filed of even date herewith. This halogenated Monox, however, is not directly useful as a reinforcing pigment in elastomeric compositions due to the amount of halogen contained therein which apparently prevents the obtainment of optimum physical properties in the elastomer although it does not adversely affect the color of the elastomer. On the other hand, the product of such halogenation process is light colored to white and, when fibrous or substantially fibrous Monox was used as the starting material, it retains the structure of such Monox. Hence, it would be highly desirable to provide a method for treating this light colored to white halogenated Monox to retain the benefits of the particle size and structure of the original Monox and to improve its reinforcing properties so that it could be employed in making reinforced, light colored to white elastomeric compositions, in making variously colored, reinforced elastomeric compositions, or in making reinforced elastomeric compositions without adversely affecting the original color of the elastomeric composition.

Hence, it is a primary object of the present invention to provide a method for overcoming the difficulties alluded to above and to obtain a light colored to white reinforcing derivative of halogenated disproportionated silicon monoxide.

It is another object of the present invention to provide a method for obtaining a substantially halogen-free, light colored to white, fibrous and/or non fibrous, solid silica containing reinforcing material.

Yet another object is to provide a substantially halogen-free, light colored to white, substantially fibrous, solid silica containing composition particularly useful as a reinforcing pigment for elastomeric materials.

A further object is to provide a method for reinforcing an organic polymeric composition such as an elastomeric material using a substantially halogen-free, light colored to white, fibrous and/or non-fibrous, solid silica containing composition.

A still further object is to provide an organic polymeric composition reinforced with a substantially halogen-free, light colored to white, fibrous and/or non fibrous, solid silica composition.

These and other objects and advantages of the present invention will become more apparent to those skilled in the art from the following detailed description and examples.

It now has been found according to the present invention that the silica product resulting from the halogenation of fibrous and/or non fibrous Monox containing up to about 3% by weight of halogen as described supra can readily be treated with an alcohol to remove substantially all or all of the halogen contained in the silica with essential retention of its color, particle size, surface area and structure, whether fibrous and/or non fibrous, and to provide the silica with a minor amount of a bound ester compound. The removal of halogen and the production of an ester like compound with the silica provides a pigment which exhibits hydrophobic properties, is readily dispersed with elastomeric materials to give reinforced elastomers exhibiting good physical properties and is light colored to white. It can be used to obtain light colored to white, or even variously colored elastomeric materials depending on the color pigments used with the elastomeric material.

The alcohol used to treat the halogen containing silica is one which will readily remove substantially all or all of the halogen in the silica without adversely affecting the particle size, surface area, structure or color of the silica or its use as a light colored to white reinforcing pigment in elastomers. Any alcohol can be used in practice of the present invention such as the mono- and polyhydric aliphatic, aromatic, cyclic, aliphatic-aromatic, aliphatic-cyclic, and aromatic-cyclic, saturated or unsaturated, alcohols and their substituted derivatives and the like. Preferably, the alcohol used is a stable one which will readily vaporize when heated at atmospheric or lower pressures without decomposition and will be of a sufficiently small molecular size to contact and to remove readily the halogen contained in the silica. Hence, it is preferred to use a lower molecular weight alkane, alkene or alkadiene monohydric or polyhydric alcohol. The polyhydric alcohol should be one in which the hydroxyl groups are located near each other and, more preferably, at one end of the hydrocarbon chain. The location of hydroxyl groups of the alcohol near each other facilitates bonding of the residue of the alcohol molecule to the silica surface since a number of reactive groups are presented to the halogen atoms of the silica particles for reaction with the halogen atoms. The remainder of the molecule being of an essentially hydrocarbon nature facilitates the blending of the treated pigment with elastomers and confers some water repellency on the silica pigment. Esters of the polyhydric alcohols can be used so long as the acid groups of the esters are less in number than the corresponding alcohol groups with which they were reacted or so long as there is at least one free hydroxyl group available in the ester for reaction with the halogen contained in the silica. Substituted derivatives of the alcohols such as the chlorinated and fluorinated alcohols are also useful. Mixtures of alcohols can be used.

Specific examples of alcohols useful in the practice of the present invention are methanol, ethanol, 1-propanol, 1-butanol, 2-butanol, 1-hexanol, 1-heptanol, cyclohexanol, 2-methyl cyclohexanol, 1,2-pentanediol, 2-ethylhexanol, 3-methyl-3-buten-1-ol, allyl alcohol, phenyl trimethylol methane, 1,1,1-trimethylol-2,4,4-trimethyl pentane, 1,1,1-trimethylol hexane, 1,1-dimethylol heptane, pentaerythrityl monooleate, pentaerythrityl dioleate, glyceryl monoricinoleate, glyceryl monolaurate, glycol monostearate, and the like.

The alcohol is used in the liquid or gaseous state when treating the halogen containing silica since solids affect little reaction with the halogen of the silica unless heated in which case they will also form liquids or gases depending on the temperatures employed during the reaction. Moreover, best results are obtained using the alcohol in the gas or vapor state since it is thereby in a very finely divided or dispersed form and can readily penetrate through the particles and into the pores, if any, of the silica. The use, preferably, of a gas further obviates the necessity for removal of the reaction products or unreacted alcohol from the treated silica at the end of the reaction by filtering, distillation, and so forth and eliminates any need for subsequent washing and drying. Even then it is still possible that contamination of the product through retention of halogen compounds or free alcohol may occur when using liquids.

The halogen containing silica and the alcohol used for treating the silica should be reacted under anhydrous or essentially anhydrous conditions to obtain the best results. Likewise the halogen containing silica and the alcohol used should be anhydrous or essentially anhydrous. If any water is present in the system as a liquid or a gas, or if the halogen containing silica is hydrated, the resulting halogen free silica product exhibits little or no hydrophobic properties. While such pigment can be used for many purposes, it is desired to have a hydrophobic surface or compound on/or with the silica to increase the dispersibility and/or wettability of the pigment in elastomers. Moreover, although subsequent heat treatment at about above 100–200° C. or higher will serve to develop hydrophobic properties somewhat in the pigment, it is much preferred to start with materials which are anhydrous and/or to react the silica and alcohol under anhydrous conditions to thereby develop initially the best properties in the treated halogen-free silica and to eliminate the necessity for subsequent treating steps.

The alcohol is used in an amount sufficient to remove substantially all or all of the halogen as a compound in gas or liquid form, etc. from the silica and to form an ester with the silica and should be used in an amount at least chemically equivalent to the amount of halogen contained in the silica. However, in general, an excess of alcohol is used to insure substantial or complete removal of halogen or to insure that the reaction goes to completion and to provide a medium in which the halogen compound can disperse or dissolve and be removed readily from the silica. This is particularly true when reactions are to be conducted in the liquid phase where a large excess of alcohol may be required to dissolve the halogen compound formed and to prevent gel formation.

Reaction temperatures will necessarily vary with the particular type of alcohol being used, the physical form in which the alcohol is employed, and the degree of reactivity desired. It is apparent that elevated temperatures will serve better to drive the reaction between the alcohol and halogen to completion and to remove the halogen as a compound from the silica. Accordingly, the lowest temperature used will be that at which the alcohol will melt if reaction is to be with an alcohol in the liquid phase, at which the alcohol will form a gas if reaction in the gas phase is desired or at which the vapors of the alcohol will form when any appreciable vapor pressure of the alcohol is present. On the other hand, the temperature must not be allowed to exceed the fusing or sintering point of the silica particles. Although silica melts at about 1470 to 1700° C., the fine particles of the silica due to their small size and high surface area will tend to fuse and sinter at somewhat lower temperatures. Accordingly, it is preferred that the reaction temperature not exceed about 1100° C. where no sintering is observed. It will be noted that sintering causes a loss in the fibrous particles and a growth in the size of the non fibrous and/or spherical particles which reduces the ability of the resulting pigment to reinforce elastomers. Moreover, the temperature should not exceed the decomposition point of the alcohol, for example, the point where it may decompose into components which would not react with the halogen contained in the silica, burn, be destroyed or be removed from the surface of the silica after it has replaced the halogen. Hence, the temperatures employed during the reaction should be at least sufficient to insure reaction between the halogen containing silica and alcohol and less than the sintering point of the silica and the decomposition point of the alcohol which is generally less than the sintering point of the silica. From a production standpoint it has been found best to operate within the range of from about 100 to 600° C.

While pressures employed during the reaction will usually be atmospheric, they can vary considerably. A feature of the present process is that reaction is usually carried out at atmospheric pressures. However, reduced pressure can be employed where the alcohol may decompose at atmospheric pressure. Alternatively, it may be desired to conduct the reaction at elevated pressure in an autoclave.

When reacting the silica with a gaseous alcohol, it is sometimes convenient to use an inert gas such as nitrogen, argon, helium, etc. as a carrier gas for the alcohol gas molecules or vapors to provide for better dispersion of the gas particles or to increase the rate of flow of the alcohol gas through the solid silica particles. The carrier gas should be at the same temperature as the gaseous alcohol and can be used in any volume ratio with the gaseous alcohol depending on the concentration of alcohol and reaction rate desired.

The rate of flow of the gaseous alcohol used or the time of reaction of the gaseous or liquid alcohol with the halogen containing silica will also depend on the amounts of alcohol and silica employed, the type of alcohol used, the degree of packing of the silica in the apparatus employed, the type of apparatus used, the amount of agitation used, and the degree of halogen removal desired.

The products of the present invention after being treated with an alcohol according to the methods described herein contain little or no residual halogen, so that they can be used satisfactorily in elastomers to reinforce them. However, any residual halogen can be removed by further treatment with alcohol as described herein or by treatment with steam at temperatures of from about above 100 to 350° C. Treatment with steam does not tend to remove the ester groups formed on or with the silica although it may tend to remove any nitrogen or nitrogen groups contained in the silica.

The halogen containing silica can be treated with the alcohol in an open vessel, in a pressure vessel or in a tube. An inclined rotary kiln in which the halogen containing silica flows downward countercurrently to the upward flow of the alcohol is very useful. However, the alcohol and silica can flow downward concurrently in the kiln. Fluidized beds, stationary or traveling, can also be employed. Still other apparatus and methods can be employed for treating the halogen containing silica with alcohol.

It is not precisely known how the halogen atoms are attached to the silica molecules or particles as a result of halogenating Monox to obtain a halogen containing silica. The halogen atoms or molecules may be absorbed in the silica or attached through physical-chemical bonds. However, whatever may be the true nature of the bonding mechanism, it has been found that the bond is rather strong since mere heat alone will not readily serve to remove the halogen. However, if the halogen containing silica is treated with an alcohol as disclosed herein, the halogen can readily be removed as a hydrogen halide dissolved in the liquid alcohol if such were used or as hydrogen halide gas if a gaseous alcohol was employed and removed from the silica with the production of an ester of the alcohol with the silica as shown below:

$$-\overset{|}{\underset{|}{Si}}-O-\overset{|}{\underset{|}{Si}}-Halogen + HOR(excess) \xrightarrow{\text{liquid phase}}$$

$$-\overset{|}{\underset{|}{Si}}-O-\overset{|}{\underset{|}{Si}}-OR + \text{Hydrogen halide in alcohol}$$

or $$-\overset{|}{\underset{|}{Si}}-O-\overset{|}{\underset{|}{Si}}-Halogen + HOR \xrightarrow{\text{gas phase}}$$

$$-\overset{|}{\underset{|}{Si}}-O-\overset{|}{\underset{|}{Si}}-OR + \text{Hydrogen halide} \uparrow$$

When the alcohol has more than one OH radical, the reaction may proceed as follows:

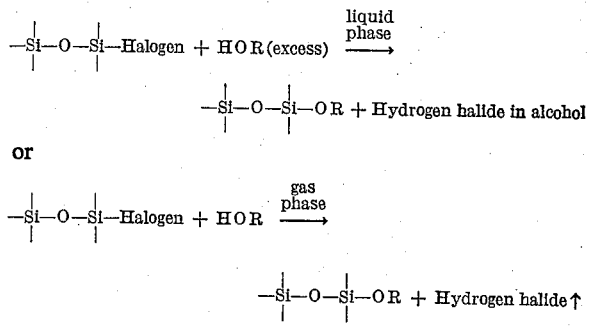

or, if a silicon atom has more than one halogen atom, the reaction may also proceed as follows:

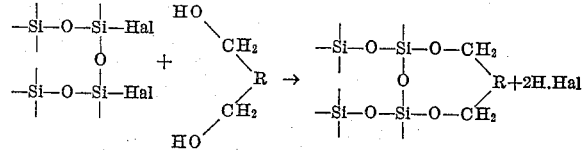

The residue of the alcohol is believed bound as an ester to the silica and can be represented as follows:

$$\left\{[a-(m+n+p)]SiO_2 + m\left[SiO_{3/2}+\frac{1}{v}(-OR)\right] + n\left[SiO+\frac{2}{v}(=OR)\right] + p\left[SiO_{1/2}+\frac{3}{v}(\equiv OR)\right]\right\}$$

where $a$=total number of $SiO_2$ groups before reaction of the halogenated silica with the alcohol compound, $m$=number of $SiO_2$ groups with 1 valence link to OR groups, $n$=number of $SiO_2$ groups with 2 valence links to OR groups, $p$=number of $SiO_2$ groups with 3 valence links to OR groups, $v$=the number of valence links of an OR group attached to silica, $$m+2n+3p \text{ is divisible by } v$$

$$\frac{m+2n+3p}{v} = \text{number of OR groups}$$

and OR is the residue of the alcohol and may be polyfunctional. In general, the amount of halogen replaced will be substantially chemically equivalent to the ester produced. The ester provides the pigment with a hydrophobic compound or coating dependent to some degree on the amount of halogen contained in the halogenated Monox and serves to render it water repellent. This aids in dispersing and compounding the pigment in elastomers. Even though only a very minor amount of ester is contained in the pigment, this amount serves to render the pigment water repellent without appreciably affecting the particle size, surface area, structure or color of the halogenated silica (Monox).

The alcoholated fibrous and/or nonfibrous, particulate, amorphous silica pigments of the present invention can be used directly as reinforcing pigments in elastomeric compounds or can be coated with various materials such as alcohols, amines, silicone resins and the like to further change the surface condition of the pigment before incorporation into the elastomeric compositions. While this invention has been described with particular reference to treatment of the halogenated fibrous or substantially fibrous silica derived from Monox which affords the greatest improvement in the reinforcement of elastomeric products, particularly rubber, it is apparent that the above remarks will apply to the treated halogenated non fibrous and/or spherical form of silica from Monox which reinforces to a lesser degree but which is still useful as a loading material, filler and so forth in various elastomers. Moreover, the light colored to white alcoholated pigments prepared by the method of the present invention are not only useful in elastomers but also are useful in organic polymeric compositions generally such as in thermoplastics and thermosetting plastics, in hard rubbers, in rigid vinyls, in resins, as well as in ceramic compositions, in insulating compositions, lubricants, etc.

Examples of elastomeric materials which can be used with these pigments are natural and synthetic vulcanizable rubbers such as natural rubber, which is essentially a polymer of isoprene, balata, gutta percha, and the rubbery polymers of open-chain conjugated dienes, especially dienes having from 4 to 8 carbon atoms such as butadiene-1,3, isoprene, 2-3 dimethyl butadiene-1,3, 2-chlorobutadiene-1,3 and the like, or the rubbery copolymers, terpolymers and the like of these and similar conjugated dienes with each other or with at least one copolymerizable monomeric material such as isobutylene, styrene, acrylonitrile, methyl acrylate, ethyl acrylate, butyl acrylate, methyl methacrylate, 2-vinyl pyridine, etc. The polymeric diene elastomers generally contain at least 50% by weight of the diene and preferably contain from about 55 to 85% by weight of the diene. However, copolymers, terpolymers and other multi-component polymers containing as little as 35% or less by weight of diene can also be employed. For example, polymers of about 35% by weight of butadiene-1,3, about 35% styrene and about 30% acrylonitrile and of about 97% isobutylene and about 3% isoprene can be used. Still other polymeric materials can be used such as the polymers and copolymers of styrene, vinyl chloride, vinyl chloride-vinylidene chloride, vinyl chloride-vinyl acetate, vinylidene chloride, isobutylene, and so forth. Moreover, there can be used polymers having curable acid groups and formed by the polymerization of a major amount of an open-chain aliphatic conjugated diene and an olefinically unsaturated carboxylic acid, by the reaction of a polymer of a diene with a carboxyl supplying reagent preferably in the presence of a catalyst, by copolymerization of a diene with an olefinically unsaturated copolymerizable compound hydrolyzable to form an acid group, by copolymerization of an alkyl ester of an acrylic type acid with an olefinically unsaturated carboxylic acid, by hydrolysis of an alkyl ester of acrylic acid or by copolymerization of a major amount of a monoolefin or isoolefin with a copolymerizable compound hydrolyzable to form groups containing bound —COOH. Still other polymers can be employed such as those formed by the copolymerization of dienes with alkyl acrylates, by the polymerization of alkyl acrylates alone and by the polymerization of an alkyl acrylate with at least one other olefinically unsaturated monomer which then are hydrolyzed to obtain curable —COOH groups. In place of polymers having COOH groups, polymers having groups such as COOR, COCl, CN, CONH$_2$, COONH$_4$ and COOMe, where Me is a metal, and the like and which are convertible to COOH groups by ammonolysis, hydrolysis, or similar reaction, for example, by treating such polymers with dilute mineral acids, HCl or H$_2$SO$_4$, or concentrated or preferably dilute KOH or NaOH, can also be employed after such groups have been converted to a curable COOH group. Polymers having a SO$_3$H, SO$_2$H or PO$_3$H$_2$ group, or other acid group, or derivatives thereof convertible to the free acid on hydrolysis and which likewise can be cross-linked, cured or vulcanized can also be used. Polymeric vulcanizable synthetic rubbers formed by the polymerization of an acrylic acid ester, for example, ethyl acrylate or butyl acrylate, or mixtures of acrylic acid esters or by the copolymerization of an acrylic acid ester with a chlorine-containing monomer such as a minor amount of chloroethyl vinyl ether, vinyl chloride, or dichloro difluoro ethylene or with acrylonitrile, ethylene or styrene can likewise be used. Polyesterurethanes can also be usefully employed; they are formed by the reaction of an organic diisocyanate compound with a hydroxyl containing polyester reaction product of a dibasic acid and a glycol and cross-linked by means of a polyfunctional hydroxyl or polyhydroxy compound. The silicone rubbers can also be employed. Mixtures of the foregoing elastomers can also be used. Elastomeric materials other than those specifically mentioned above are also useful.

In reinforcing an organic polymeric or elastomeric material, a minor amount of the treated halogenated pigment of the present invention is generally used with a major amount of the material. Preferably, in order to obtain the best results the composition will contain from about 25 to 45% by weight of the pigment of this invention to from about 75 to 55% by weight of the polymer or elastomer, exclusive of other compounding ingredients.

Appropriate compounding ingredients such as other fillers, processing aids, accelerators, vulcanizing agents, curing agents, cross-linking agents, stabilizers, retarders, plasticizers, anti-oxidants, resins, dyes, color pigments, fungicides, and so forth may be employed with the elastomeric and other compositions.

For the purposes of the present invention it is to be understood that the word "curing" in the specification and claims is intended to cover vulcanizing, cross-linking, condensing, fusing or other treatment of the organic polymeric composition, such as an elastomer, by which it, whether a conjugated diene, polyester urethane, carboxyl containing polymer, acrylate, vinyl or other elastomer, under the action of heat, light, or vulcanizing, cross-linking, condensing and/or other agent, has its best physical properties developed as is well known to those skilled in the art. "Curing" is also intended to cover the method of only heating those polymeric compositions or elastomers which soften on heating and harden or toughen on cooling as well as the method employing those materials which vulcanize, cross-link, etc., at room temperature and below.

The products of the present invention will find utility as a filler or reinforcing pigment in elastomeric compositions for tire treads, white sidewalls of tires, V-belts, gloves, shoe soles, heels, printing rollers, cutless bearings and wherever it is desired to reinforce an elastomer with a light colored to white solid silicon monoxide derivative. It is noteworthy that the use of the alcoholated halogen-free pigment described herein, particularly in the form of fibers, not only affords good reinforcing properties to rubbery materials comparable to those imparted by carbon black compounds but also permits the obtainment of light colored to white elastomeric materials. Since the pigment obtained according to the present invention has little covering power, elastomeric compositions reinforced with such pigment can be pigmented or dyed to provide colored elastomeric materials which can not be obtained when carbon black is used and which can not be obtained to any degree with the original brown Monox. Since the pigment of the present invention has the same index of refraction as benzene, for it disappears in benzene when added thereto, or as the elastomeric material in which incorporated, it does not tend to adversely color the elastomer as would the original brown Monox or as would an opaque pigment such as carbon black nor tend to color the elastomer without reinforcing it as does titanium dioxide. Rather, the pigments produced by the methods disclosed herein are somewhat translucent and accordingly can be combined with various organic and inorganic color pigments such as phthalocyanine blue, phthalocyanine green, chrome red, chrome yellow, titanium dioxide, ultramarine blue, and the like in minor amounts to give colored, reinforced elastomeric products of great utility. It is only necessary to use a very minor amount of the coloring pigment so that the reinforcing properties of the new reinforcing pigment are not lost.

The following examples will serve to illustrate the invention with more particularity to those skilled in the art:

*Example I*

Monox was prepared by reacting sand and anthracite coal by means of an arc in an arc furnace to produce a mixture of SiO and CO gas. The SiO gas in the mixture was condensed by contacting it without substantial turbulence with a mixture of commercial (oil pump) nitrogen gas containing about 1% by volume of ammonia. The condensate $(SiO_2)_x \cdot (Si)_y$ which was brown, particulate or finely divided, solid and substantially fibrous Monox, contained about 4.07% by weight of nitrogen by analysis (Kjeldahl) and 0.07% by weight of chlorine apparently from the starting materials, laboratory atmosphere, etc. This brown Monox was then halogenated in a stream of anhydrous chlorine gas at 800° C. for about one hour to remove the silicon as crude silicon tetrachloride and to provide a white, amorphous $SiO_2$ containing about 2.1% by weight of chlorine and 4.4% by weight of nitrogen (Kjeldahl) and having essentially the same physical form as the original Monox, that is, being substantially fibrous and particulate although apparently some of the non fibrous particles may have been removed. Three grams of the chlorinated Monox product were then placed in an autoclave and 100 cc. of n-butyl alcohol added to form a slurry. The autoclave containing the slurry was then heated at 160° C. for about an hour while being vigorously agitated by shaking. At the end of the reaction, the slurry was permitted to settle, decanted and washed and filtered several times with alcohol. A part of the reaction slurry was analyzed and found to contain chloride ion. The pigment was finally dried in an oven at 100° C. overnight and analyzed. Analysis of the resulting pigment showed that it contained 1.09–1.13% chlorine but gave a C, O and H analysis essentially chemically equivalent to the chlorine replaced and was computed to show that the pigment now contained —O—$(CH_2)_3$—$CH_3$ groups. The pigment's bulk density was greater than that of the untreated halogen containing silica although it still exhibited the same white color. Under the electron microscope the pigment exhibited essentially the same particle size and structure as the substantially fibrous halogen containing silica or original brown Monox. Its surface area was essentially the same as that of the halogen containing silica and it was water repellent.

*Example II*

30 grams of the white substantially fibrous halogen containing silica of Example I, above, were placed in a "Vycor," high (90–92%) silica glass, tube fitted with heating elements. N-butyl alcohol was heated to 160° C. in a separate container and the vapors of the alcohol produced were introduced by means of a pipe into the inlet end of the tube where they were mixed with a stream of nitrogen gas. The nitrogen gas had been heated in a tube prior to mixing with the alcohol vapors. The gas mixture flowed through the silica particles in the tube heated to about 160–200° C. for about one hour while the gaseous reaction products and any unreacted alcohol passed out of the tube through a pipe and were partially condensed. At the end of the run the treated silica was examined and it exhibited essentially the same chemical and physical properties as shown by the liquid butyl alcohol treated halogen containing silica of Example I. The condensate was analyzed and found to contain HCl and n-butyl alcohol.

*Example III*

One run was made according to the method of Example II, above, except that allyl alcohol was used in place of n-butyl alcohol. The results produced were the same as those obtained in Example II, above, except that the silica contained an allyl ester or residue of allyl alcohol instead of n-butyl alcohol.

*Example IV*

The method of this example was the same as Example II, above, except that the tube was heated to 300° C. and two separate runs were made using 2-ethyl hexyl alcohol and 3-methyl-3 butenyl alcohol. The results obtained were the same as those obtained for the pigment of Example II except that it contained in one case an ester or residue of 2-ethylhexyl alcohol and in the other case an ester or residue of 3-methyl-3 butenyl alcohol.

*Example V*

The method of this example was the same as Example II, above, except that the tube was heated to from 300 to 500° C. and methyl alcohol was used in place of n-butyl alcohol. The results obtained were also the same as those obtained for the pigment of Example II, above, except that the pigment contained —$OCH_3$ groups. Moreover, it was observed that the rate of chlorine removal was enhanced when operating at the higher temperature.

*Example VI*

60 parts of the substantially fibrous, white, particulate, amorphous silica of Example I, above, containing a minor amount of the butyl alcohol residue as an ester of silica were mixed at 330° F. for fifteen minutes on a rubber mill with 100 parts of natural rubber, 0.4 part of dianilino methane, and 0.2 part of sulfur. At the end of the mixing period the stock was cooled and mill mixed at 160° F. with 5 parts of zinc oxide, 1½ parts of stearic acid, 1 part of pine oil, 1 part of phenylbetanaphthylamine, 1 part of didodecylamine, 1 part of benzothiozyl disulfide and 3 parts of sulfur. All parts were by weight. Samples of the mixed stock were then placed in molds and vulcanized at 280° F. for varying periods of time to make light colored vulcanizates. The vulcanizates were light colored instead of white since the rubber itself was not white. The vulcanizates were then tested and the results obtained on test are shown below:

| Cure time, Mins. | 300% Modulus | Tensile Strength, p. s. i. | Elongation at break, percent |
| --- | --- | --- | --- |
| 10 | 310 | 800 | 500 |
| 20 | 600 | 1,350 | 490 |
| 40 | 950 | 1,750 | 425 |
| 60 | 1,300 | 2,300 | 450 |
| 80 | 1,450 | 2,550 | 450 |

The results show that the new pigment of the present invention will reinforce rubber to provide light colored vulcanized rubbers exhibiting good physical properties.

Example VII

The substantially fibrous products produced by the methods of the present invention were compounded in rigid vinyl formulations and tested as follows:

| Component | Parts by Weight | | | | |
|---|---|---|---|---|---|
| | Comp. A | Comp. B | Comp. C | Comp. D | Comp. E |
| Polyvinyl chloride | 100 | 100 | 100 | 100 | 100 |
| 75–25 styrene-acrylonitrile copolymer (processing aid) | 5 | 5 | 5 | 5 | 5 |
| Lead Stearate | 0.5 | 0.5 | 0.5 | 0.5 | 0.5 |
| Stabilizer (Thermolite #31, organic tin compd.) | 2 | 2 | 2 | 2 | 2 |
| 60/20/20 terpolymer of butadiene-1,3, acrylonitrile and styrene (toughener) | 5 | 5 | 5 | 5 | 5 |
| Halogenated Monox (condensed in $N_2+NH_3$) and treated with BuOH gas @ 160° C | 21 | | | | |
| Halogenated Monox (condensed in $N_2+NH_3$) and treated with allyl alc. gas @ 160° C | | 16 | | | |
| Halogenated Monox (condensed in $N_2+H_2$) and treated with liq. BuOH @ 160° C | | | 36 | | |
| Control | | | | 33 | |
| Monox (condensed in $N_2+H_2$) | | | | | |
| Izod, ft. lbs./in. notch | 1.0 | 1.6 | 1.6 | 2.6 | 0.9 |
| $T_1$, ° C | 82 | 90 | 87 | 77 | 89 |
| $T_2$, ° C | 156 | 153 | 160 | 126 | 155 |

$T_1$ is the transition temperature of the formulation, the point at which a piston under a given load supported by granules of the formulation in a cup moves when the cup is heated. $T_2$ is the fusion temperature of the formulation, the point at which the granules have apparently become fused and are extruded through a hole in the bottom of the cup. The above data, thus, shows that the treated pigments of the present invention can be used to produce light colored vinyl compositions.

Example VIII

Halogenated, substantially fibrous Monox in which $SiO_2$ gas had been condensed in a mixture of nitrogen and hydrogen gases without substantial turbulence was treated with liquid butyl alcohol at 160° C. It then was formulated in a silicone rubber recipe and tested as follows:

Component | Parts by weight
--- | ---
BuOH treated pigment | 40
Methyl silicone rubber (Linde Air Products Co., silicone gum stock X–95) | 100
Dicumyl peroxide | 2

Stress strain at R. T.; press. 15′ at 300° F.; 24 hrs. at 300° F. oven:

Tensile, p. s. i. | 550
--- | ---
Elongation, percent | 175
Modulus, 200% | —

Stress strain at 212° F.:

Tensile, p. s. i. | 490
--- | ---
Elongation, percent | 150
Modulus, 200% | —

The above data show that the pigments can be compounded in silicone rubbers to give light colored products.

In summary, the present invention teaches that light colored to white silicon and oxygen containing fibrous and/or nonfibrous pigments may be obtained by the treatment of halogenated Monox with an alcohol to remove all or substantially all of the halogen contained in the halogenated Monox. If any halogen is retained in the products produced by the method of the present invention, it is present in such a small amount that it is insignificant or has no adverse effect on materials with which compounded. The resulting product exhibits essentially the same structure and particle size as the halogenated Monox, halogen containing silica starting material, or original brown Monox, may have a higher surface area than the original brown Monox, will contain a bound ester of the alcohol, said bound ester being present in a minor amount generally chemically equivalent to the halogen replaced, will be light colored to white in color, and will be substantially amorphous silica. The products produced by the method of the present invention will have great utility as reinforcing pigments in organic polymeric composition such as elastomeric materials and will permit the obtainment of light to white and even variously colored organic polymeric and elastomeric materials.

What is claimed is:

1. The method comprising treating a light colored to white, particulate, solid material comprising amorphous silica containing halogen attached to the silicon of said silica in an amount not in excess of about 3% by weight, with an alcohol compound free of amine groups in the fluid state and in an amount, at a pressure and at a temperature sufficient to replace substantially all of said halogen of said silica with a residue of said compound attached to said silica through oxygen and without causing sintering of said silica and without decomposition of said alcohol compound.

2. The method comprising treating under essentially anhydrous conditions a light colored to white, particulate, solid material selected from the group consisting of amorphous silica and amorphous silica containing bound nitrogen groups, the number of atoms of nitrogen in said nitrogen groups being substantially equivalent to the number of nitrogen atoms in particulate solid silicon monoxide containing from about 1 to 8% by weight of bound nitrogen, said amorphous silica containing halogen attached to the silicon of said silica in an amount not in excess of about 3% by weight, with a gaseous stable alcohol compound free of amine groups and in an amount, at a pressure and at a temperature up to about 1100° C. to remove substantially all of said halogen from said silica and to leave a residue of said compound attached through oxygen to said silica and without decomposition of said alcohol compound.

3. The method comprising treating under essentially anhydrous conditions a white, substantially fibrous, particulate solid material selected from the group consisting of amorphous silica and amorphous silica containing bound nitrogen groups, the number of atoms of nitrogen in said nitrogen groups being substantially equivalent to the number of nitrogen atoms in particulate solid silicon monoxide containing from about 1 to 8% by weight of bound nitrogen, said amorphous silica containing halogen attached to the silicon of said silica in an amount not in excess of about 3% by weight, with a gaseous stable alcohol compound selected from the group consisting of the lower molecular weight alkane, alkene, and alkadiene monohydric and polyhydric alcohols, the hydroxyl groups of said polyhydric alcohols being positioned near each other on the hydrocarbon chain, and esters of said polyhydric alcohols, said esters containing at least one hydroxyl group, and mixtures thereof, said alcohol compound being free of amine groups, and in an amount, at a pressure and at a temperature of from about 100 to 600° C. to form a halogen compound with substantially all of said halogen in said silica, to thereby remove substantially all of said halogen compound from said silica and to replace said halogen of said silica with a residue of said alcohol compound attached to said silica through oxygen.

4. The method comprising treating under essentially anhydrous conditions a white, particulate solid material selected from the group consisting of substantially fibrous amorphous silica and substantially fibrous amorphous silica containing bound nitrogen groups, the number of atoms of nitrogen in said nitrogen groups being substantially equivalent to the number of nitrogen atoms in particulate solid silicon monoxide containing from about 1 to 8% by weight of bound nitrogen, said amorphous silica containing halogen attached to the silicon of said silica in an amount not in excess of about 3% by weight, with a gaseous stable alcohol compound in an amount in excess of that chemically equivalent to the amount of said halogen in said silica and being selected from the group consisting of the lower molecular weight alkane, alkene, and alkadiene monohydric and polyhydric alcohols, the hydroxyl groups of said polyhydric alcohols being positioned near each other on the hydrocarbon chain, and esters of said polyhydric alcohols, said esters containing at least one hydroxyl group, and mixtures thereof, said alcohol compound being free of amine groups, and at a pressure and at a temperature of from about 100 to 600° C. to form a halogen compound with substantially all of said halogen in said silica, to thereby remove substantially all of said halogen compound from said silica and to replace said halogen of said silica with a residue of said alcohol compound attached to said silica through oxygen, the fibers of said substantially fibrous silicas having a ratio of length to width of at least about 10:1 to 50:1, an average length of at least about 50 to 600 millimicrons and a surface area of about 60 to 200 square meters per gram.

5. The method according to claim 4 in which said halogen comprises chlorine.

6. The method according to claim 5 in which said alcohol compound comprises methyl alcohol.

7. The method according to claim 5 in which said alcohol compound comprises ethyl alcohol.

8. The method according to claim 5 in which said alcohol compound comprises n-butyl alcohol.

9. The method according to claim 5 in which said alcohol compound comprises allyl alcohol.

10. The method according to claim 5 in which said alcohol compound comprises 3-methyl-3-butenyl alcohol.

References Cited in the file of this patent
UNITED STATES PATENTS

| | | |
|---|---|---|
| 2,535,036 | Broughton | Dec. 26, 1950 |
| 2,560,043 | Schmidt | July 10, 1951 |
| 2,578,605 | Sears | Dec. 11, 1951 |
| 2,657,149 | Iler | Oct. 27, 1953 |
| 2,663,650 | Iler | Dec. 22, 1953 |
| 2,692,871 | Pechukas | Oct. 26, 1954 |
| 2,739,077 | Goebel | Mar. 20, 1956 |
| 2,739,904 | Frey | Mar. 27, 1956 |
| 2,757,098 | Berry et al. | July 31, 1956 |

UNITED STATES PATENT OFFICE
CERTIFICATE OF CORRECTION

Patent No. 2,865,782                                      December 23, 1958

Roger W. Strassburg

It is hereby certified that error appears in the printed specification of the above numbered patent requiring correction and that the said Letters Patent should read as corrected below.

Column 2, line 43, after "by weight of" insert -- halogen and being essentially free of silicon. This --; column 3, line 51, for "si ica" read -- silica --; column 11, line 25, in the table, Example VII, sixth column thereof, strike out the numeral "33" opposite "Control" and insert the same in line 27, opposite "$H_2$"); column 11, line 43, for "$SiO_2$" read -- SiO --.

Signed and sealed this 16th day of June 1959.

(SEAL)
Attest:

KARL H. AXLINE                                                  ROBERT C. WATSON
Attesting Officer                                         Commissioner of Patents